Patented Mar. 7, 1933

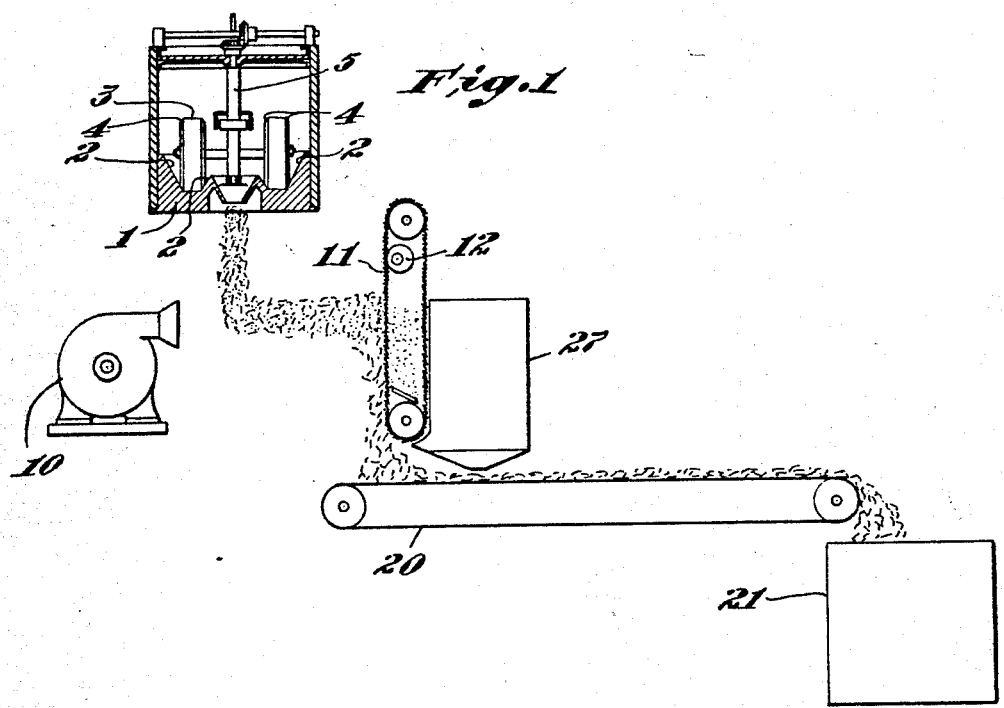

1,899,985

UNITED STATES PATENT OFFICE

ROLAND B. RESPESS, OF WICKFORD, RHODE ISLAND, ASSIGNOR TO RESPATS INC., OF CRANSTON, RHODE ISLAND, A CORPORATION OF RHODE ISLAND

FIBROUS PRODUCT AND MANUFACTURE OF SAME

Application filed July 8, 1930. Serial No. 466,465.

This invention relates to fibrous articles and to the treatment of fibrous or woody material, notably wood of high resinous or gummy content so that the same may be reduced or plasticized to a condition suitable for the formation of wall board, insulating material, paneling or hot pressed or molded objects, or so that the reduced material may be advantageously employed in a cementitious aggregate to afford a relatively light, yet strong, concrete having desirable insulating qualities and/or low cost.

My copending application, Serial No. 297,939, filed August 7, 1928, (Letters Patent No. 1,770,430, dated July 15, 1930) of which the present application is a continuation in part, discloses and describes apparatus for reducing fibrous material by the employment of sand, which may be formed into fiber board, insulating board, or the like. In accordance with the present invention, the fibrous material may preferably be treated or reduced in its raw uncooked state so that substantially all of the natural resins and woody gums are retained. The treatment preferably, but not necessarily, includes the employment of a discrete splitting agent such as sand, which may be removed from the reduced material if the same is to be formed into fiber board, paneling, molded objects or the like according to the process disclosed in my said copending application, Serial No. 297,939, or the reduced fibrous material with the included sand, may be mixed with cementitious material to form a suitable fiber-cement composition and/or fibrous concrete. In some cases it may be desirable to separate a portion of the loose sand from the fibrous material, while the remainder of the mixed and included sand may be retained and employed in the manufacture of concrete.

The resulting concrete is advantageous in having a relatively light weight and in having superior insulating and nailing qualities; furthermore, in certain locations where gravel or stone is relatively scarce and expensive, my process is advantageous in permitting the inexpensive manufacture of concrete from native wood waste or vegetable matter, thus being for example particularly advantageous for the building of roads, side walks, as well as for building construction. Concrete of this character may be readily formed into wall board, hollow tile, bricks, blocks, slabs and the like for building purposes.

The cementitious material which is employed is preferably Portland cement, although other suitable bonding agents may be substituted. Concrete or fiber-cement formed in accordance with my preferred process includes woody or vegetable components having abrasive or sand particles in penetrative or attached engagement therewith, the components preferably being preponderantly partially split with numerous projecting individual fiber or hair-like extensions which interlock wth the cementitious material to aid the structural strength of the concrete. Furthermore, the retention of a major portion of substantially all of the natural wood gums, particularly in the case of woody materials having a high resinous content, is advantageous in protecting the wood from deterioration in the presence of moisture and in permitting the effective setting of the cementitious ingredient. In other words the preferred mode of manufacturing concrete in accordance with this invention avoids substantial cooking of the fibers, the consequent loss of the natural protective gums or resins and chemical reactions which change the nature of the wood and which may have a deleterious effect upon the setting of the cementitious material.

In accordance with this invention, woody fragments or suitable fibrous material such as sisal, bamboo shoots, saw grass, cotton stalks, corn stalks, and various other fibers may be mechanically reduced to retain substantially all of their natural gums. The invention, however, will be particularly described with reference to the treatment of wood waste or wood balks and chips; particularly wood of relatively high resinous content, such as Southern or yellow pine, may be reduced to produce a suitable fibrous mass either for the formation of fibrous articles and/or for inclusion in a wood or fibrous concrete. To these ends the fibrous material may preferably be treated with a discrete splitting agent such as sand, for example, in a mill of the character disclosed in my said copending application, Serial No. 297,939. If desired, the chips may be first subjected to a restrained cooking operation such as disclosed in that application which will not result in the loss of a substantial portion of their natural gums or resins; preferably, however, the raw, uncooked wood is immediately subjected when moist to the macerating action of the mill and sand. The chips as thus reduced may be separated from the sand in suitable beating machines or agitating devices, or some or all of the chips with the sand included therein, but in their reduced condition may be employed for forming a concrete aggregate, it being evident that additional sand as well as cementitious material may be added for this purpose, if desired.

In the accompanying drawing:

Fig. 1 is a diagrammatic representation of typical apparatus which may be employed for the reduction of vegetable or wooded material in this manner, the figure showing apparatus arranged to provide fibrous stock, both for the manufacture of fibrous concrete;

Fig. 2 is an enlarged detail view of a typically woody component treated in accordance with this invention; and Fig. 3 is a similar view of such a component also encrusted with cement.

Any suitable fibrous material may be employed for the purpose of this invention. If desired this material may first be subjected to a short cooking operation somewhat to soften the chips, balks or the like, but preferably raw chips, while moist, are immediately subjected to a mechanical reducing operation which preferably may occur in the presence and through the action of a splitting agent such as sand. For this purpose the woody materials or chips should be moist so that they may be readily softened and plasticized, while undue wetness of the material is preferably to be avoided unless the concrete is to be ground mixed ready for pouring. In any case the amount of water which is employed should be insufficient to float the chips. Preferably, although not necessarily, a limited quantity of dry Portland cement in the form of fine powder is mixed with the sand and wood chips in a suitable mill where the chips are subjected to a kneading, macerating and splitting action, such a mill for example is disclosed in my said copending application, and is diagrammatically illustrated in Fig. 1 of the accompanying drawing. For example 5 pounds of sand and 2½ pounds of cement may be ground with 10 pounds of wood and 3 pounds of water in this mill.

The mill 1 as shown is provided with an annular bed having inclined sides 2, which receives heavy rollers 3 having beveled side portions 4. The rollers are driven by a vertically disposed shaft 5 and arranged so that they may have some freedom of movement vertically and horizontally, thereby causing the reduction, macerating or partial splitting of the woody balks or chips and the penetration of the same by the sand if the latter is used. Preferably this reducing operation may be continued until the material typically comprises woody components in the form of partially separated or splintery bundles of fibers, which have numerous sand particles in included and penetrative engagement therewith and which are typically but lightly coated or encrusted with the powdered cementitious material, the latter filling the smaller interstices and/or pores of the wood splinters and adhering to the surface thereof. It is evident that if a limited quantity of cementitious material is thus included with the chips in the reducing operation that the latter should only have sufficient moisture to permit satisfactory plasticizing to render them soft and spongy and typically split without causing setting of the cementitious material.

The reduced material together with the sand and the cement, if the latter is employed, may be removed from the mill from time to time or continuously by any suitable means, as shown being emitted from the center of the mill. The material may then be dropped into a blast of air coming from a blower 10 which carries the material into engagement with a vertically movable screen belt 11. The latter preferably is associated with means such as an eccentrically mounted roller 12 which vibrates the run of the belt against which the material is blown by the air blast. Accordingly the blast and vibrating belt cooperate in effecting the removal of the loose sand from the woody material, leaving the major portion of the cement and the sand which is included and in penetrative engagement with the woody components so that these materials as thus intimately mixed may drop to a suitable receiving means such as the belt 20 which for example, if desired, may pass into a suitable drying room to permit the removal of moisture from the chips. A receiving chamber 21 may be provided adjoining the screen 11 to receive the loose sand that is removed from the material thus permitting reclamation of the sand and stray cement for reuse in the reducing mill. From the drying belt or conveyor 20 the material may pass to any suitable receiving means such as the storage vat 21.

The removal of loose sand and excess moisture is advantageous when the reduced woody material is to be shipped at a distance for inclusion in a cementitious aggregate, and accordingly when it is desirable to reduce the material to a low shipping weight. However the cementitious aggregate may be formed in the vicinity of the reducing mill, and the removal of the loose sand and the drying of the chips may then be omitted. The employment of a limited quantity of cement in the reducing mill is effective in causing the typical encrustation of the woody components with the cement and thus aids in the ultimate union of the wood with the cementitious constituents of the concrete. The fibrous material preferably with included sand and a light covering of cement is added to a water mixture of Portland cement and additional inert material such as sand and/or gravel or crushed stone to form the ultimate cementitious mix, the ingredients of this mix having relative proportions by bulk comparable to those of well-known concrete formulas and the proportion of woody components in my mixture being analogous to that of the gravel or stone in such a conventional formula.

An aggregate formed in accordance with the present invention may be employed for many purposes, for example, to form slabs, wall board, tile, blocks or for pouring in building structures or for the foundation or base layers for road slabs, side walks or the like. Under some conditions it is desirable to form the aggregate in the vicinity of the location of the wood reducing mill, and under these conditions there is little advantage in removing the loose sand and cement or excess moisture from the mixture and additional cement, sand and water may be added. Under many conditions, however, it is advantageous to ship the dried chips with the penetrative inclusions of sand and the cement encrustration, the mixture as thus shipped, being added to sand and/or crushed stone or gravel and Portland cement at the point of use. While it is not essential, it is desirable to coat the woody components with the cement as this aids their ultimate union with the cementitious mass, which also is aided by the irregular partially split, splintery characteristics of the woody components. Furthermore, the employment of woody material which retains substantially all of its natural gums, particularly material of high resinous content is advantageous in permitting the proper setting of the cementitious material, and in avoiding any undue tendency of the wood to deteriorate.

If it is desired to employ the reduced woody material for the manufacture of wall board, paneling or molding articles for example in accordance with the process disclosed and claimed in my copending application, Serial No. 297,939, for reducing uncooked fiber, sand, without cement, may be mixed with the fibrous material in the mill. The sand may thereafter, under these conditions, be entirely separated from the fibrous material. For example, the material with a relatively large proportion of added water may be further reduced in a suitable beater or Jordan machine and the sand concomitantly removed.

It is accordingly evident that the present invention provides means for reducing vegetable or woody material which may be employed either to permit the reduction of such material in an uncooked state, using sand as a splitting aid, for the manufacture of fibrous articles such as wall board paneling or molded articles, or that the woody components may be mixed with or included in a cement or a concrete aggregate which preferably is characterized by the penetrative inclusion of sand particles in partially split fibrous bundles which may retain substantially all of the natural wood gums.

I claim:

1. Method of making wood and cement aggregate, comprising the mechanical reduction of raw, uncooked wood to provide splintery and incompletely separated fibrous bundles, whereby the natural gums of the wood may be retained, and mixing the reduced wood with cementitious material to provide a fiber-cement mixture.

2. Method of making a fiber-cement, comprising the subjection of wood chips to the abrasive and splitting action of sand mixed therewith, and mixing the reduced chips and the sand with cementitious material.

3. Method of making concrete comprising the reduction of wood chips of high resinous content by the employment of sand mixed therewith and acting as a splitting agent to provide reduced material with a large portion of partially split and frayed fibrous bundles, adding the mixed sand and reduced wood to cement, sand, and water, and causing the cement to set.

4. Concrete formed of an aggregate comprising cementitious material including fibrous components in the form of bundles of vegetable fibers with sand particles in penetrating and embedded engagement with said bundles.

5. An aggregate comprising cementitious material including woody components retaining the major portion of their natural gums in the form of bundles of fibers with sand particles in penetrating and embedded engagement with said bundles.

6. Method of making wood concrete comprising the mixture of uncooked woody material with sand, then subjecting the woody material to a splitting, kneading and macerating action, and adding the resulting mixture of reduced woody elements which retain substantially all their natural gums and the sand to Portland cement and additional inert material, and allowing the resulting mix to set.

7. An aggregate comprising cementitious material with included woody components typically in the form of partially separated, porous fibrous bundles with sand and cementitious coating material in penetrative engagement therewith.

8. Method of reducing woody vegetable material to a state suitable for inclusion in concrete and for other purposes which comprises subjecting the raw uncooked material to splitting, macerating and kneading in the presence of sand.

9. Method of making fibrous concrete which comprises subjecting the raw uncooked material to splitting, macerating and kneading in the presence of sand, thereby providing numerous fibrous bundles with sand included in penetrative engagement therewith, mixing said bundles and the included sand with additional sand and a cement, and allowing said cement to harden.

10. Method of treating woody material comprising the mixing of the material while moist with sand and a limited quantity of discrete cement, and subjecting the resulting mixture to a splitting, macerating and kneading action so that the woody material is typically in the form of fibrous bundles with sand in penetrative attachment and inclusion and the cement in encrusted engagement.

11. Method of treating woody material comprising the mixing of the material while moist with sand and a limited quantity of discrete cement, and subjecting the resulting mixture to a splitting, macerating and kneading action so that the woody material is typically in the form of fibrous bundles with sand in penetrative attachment and inclusion, and the cement in encrusted engagement, and removing the loose sand from the resulting mixture.

12. Reduced wood treated for inclusion in a concrete aggregate comprising fibrous bundles with sand in included and penetrative engagement.

13. Reduced wood treated for inclusion in a concrete aggregate comprising fibrous bundles with sand in included and penetrative engagement and with an encrustation of discrete cement.

14. Method of making fibrous concrete which comprises subjecting the raw uncooked fibrous material to splitting, macerating and kneading in the presence of sand, thereby providing numerous fibrous bundles with sand included in penetrative engagement therewith, removing the loose sand from the resulting mixture while leaving the sand in penetrative engagement, mixing said bundles and the included sand with additional sand and a cement, and allowing said cement to harden.

15. Method of making a fiber-cement comprising the reduction of woody material to provide a fibrous mass characterized by numerous fibrous bundles having splintery extensions and retaining the major portion of their natural gums, adding the reduced wood to a liquid mixture which includes water and a cementitious ingredient, and drying water out of the mixture, thus leaving the woody components bound by the cementitious ingredient.

16. Method of making a fiber-concrete, comprising the reduction of uncooked wood chips by a mechanical splitting and fraying treatment to provide material characterized by numerous partially split fibrous bundles with splintery extensions and retaining the major portions of the natural wood gums, adding the reduced wood to a liquid mixture which includes water and a cementitious ingredient, and drying water of the mixture, thus leaving the fibrous bundles bound in interlocked engagement with the cement.

17. Concrete comprising Portland cement, sand, and shredded components of wood, retaining the major portion of the natural wood gums, said components typically being in the form of partially split fibrous bundles with numerous projecting splintery extensions, the cement being set in direct interlocked engagement with the splintery extensions and partially split portions.

18. Concrete comprising cement, sand, and shredded components of wood of high resinous content, said components typically being in the form of partially split fibrous bundles with numerous projecting splintery extensions, the cement being set in direct interlocked engagement with the splintery extensions and partially split portions, said components retaining substantially all of their natural resins to afford a protective agent for the fibers of the wood.

Signed by me at Providence, Rhode Island, this second day of July, 1930.

ROLAND B. RESPESS.